(12) United States Patent  
Haller

(10) Patent No.: US 8,998,163 B2  
(45) Date of Patent: Apr. 7, 2015

(54) DEVICE AND METHOD FOR SPRINGING A VEHICLE SEAT

(71) Applicant: Grammer AG, Amberg (DE)

(72) Inventor: Erwin Haller, Birgland (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 13/683,680

(22) Filed: Nov. 21, 2012

(65) Prior Publication Data

US 2013/0320733 A1     Dec. 5, 2013

Related U.S. Application Data

(63) Continuation of application No. 10/812,833, filed on Mar. 30, 2004, now abandoned.

(51) Int. Cl.
| | |
|---|---|
| *F16M 13/00* | (2006.01) |
| *B60N 2/16* | (2006.01) |
| *B60N 2/50* | (2006.01) |
| *B60N 2/52* | (2006.01) |

(52) U.S. Cl.
CPC .............. *B60N 2/1665* (2013.01); *B60N 2/501* (2013.01); *B60N 2/505* (2013.01); *B60N 2/525* (2013.01)

(58) Field of Classification Search
USPC ................. 248/157, 419, 424, 562, 565, 566; 267/136, 140.11, 140.14, 140.15, 267/140.5
See application file for complete search history.

(56) References Cited

U.S. PATENT DOCUMENTS

| | | | | |
|---|---|---|---|---|
| 4,087,069 | A * | 5/1978 | Hall et al. ..................... | 248/573 |
| 4,397,440 | A * | 8/1983 | Hall et al. ..................... | 248/550 |
| 4,946,145 | A * | 8/1990 | Kurabe ......................... | 267/131 |
| 5,004,206 | A * | 4/1991 | Anderson ..................... | 248/585 |
| 5,234,203 | A * | 8/1993 | Smith ........................... | 267/131 |
| 5,574,424 | A * | 11/1996 | Nguyen .................. | 340/426.11 |
| RE35,572 | E * | 7/1997 | Lloyd et al. .................. | 248/562 |
| 5,735,509 | A * | 4/1998 | Gryp et al. ................... | 267/131 |
| 6,237,889 | B1 * | 5/2001 | Bischoff ...................... | 248/622 |
| 6,264,163 | B1 * | 7/2001 | Ivarsson ...................... | 248/588 |
| 6,371,456 | B1 * | 4/2002 | Ritchie et al. .............. | 267/64.12 |
| 6,719,258 | B2 * | 4/2004 | Bryngelson et al. .......... | 248/419 |
| 6,886,650 | B2 * | 5/2005 | Bremner .................... | 180/89.13 |

FOREIGN PATENT DOCUMENTS

KR        2004001387 A   *   1/2004

* cited by examiner

*Primary Examiner* — Alfred J Wujciak  
(74) *Attorney, Agent, or Firm* — Lowe Graham Jones PLLC

(57) ABSTRACT

The invention relates to a spring device for a vehicle seat, in particular a utility vehicle seat having at least one air spring arranged between a seat part and a lower part for the height adjustment (5) of the seat part and having a control device for controlling the supply and discharge of at least one additional air volume to or from the air spring, wherein at a predefined run in and/or run out position (9) of the air spring, the additional air volume that can be supplied or discharged can be changed or switched off by means of the control device such that inclines in the profile of a force-path air spring characteristic (1; 1*a*, 1*b*, 1*c*) of the air spring in a first and in at least one further range (2, 3,4) are different from one another. Furthermore, a description is given of a method of springing a vehicle seat.

10 Claims, 4 Drawing Sheets

DEVICE AND METHOD FOR SPRINGING A VEHICLE SEAT

PRIORITY CLAIM

This application is a continuation of U.S. application Ser. No. 10/812,833 which was filed on Mar. 30, 2004 which claims priority to German Application No. 10317134.7 which was filed on Apr. 14, 2003 and German Application No. 10317122.3 filed on Apr. 14, 2003.

FIELD OF THE INVENTION

The invention relates to a device and method for springing a vehicle seat, in particular a utility vehicle seat having at least one air spring arranged between a seat part and a lower part for the height adjustment of a seat part and having a control device for controlling the supply and discharge of at least one additional air volume to or from the air spring.

BACKGROUND OF THE INVENTION

Spring devices for vehicle seats are known in particular for attenuating a height excursion of the vehicle seat when travelling over uneven road surfaces, such as potholes. EP 1 188 608 A1 discloses an active suspension system for sprung vehicle seats, in which a pneumatic offload device and a hydraulic actuating member are arranged between a seat part and a lower part that is connected to the vehicle, along with a mechanical flexible connection device. Both the pneumatic offload device and the hydraulic actuating member are controlled by a control device as a function of a seat error signal, which is generated for example by a jerky height adjustment of the seat part.

Such hydraulic actuating members require a connection to the on-board power supply of the vehicle, in particular of a utility vehicle. Such a connection results in the function of the active suspension of the vehicle seat being dependent on the function of the on-board power supply and in particular the parameters thereof, so that it is necessary to match the parameters of the suspension system to the parameters of the on-board power supply and thus to adapt the system to the respective utility vehicle.

Moreover, air springs are known which have a force-path air spring characteristic that runs linearly, the incline of which can be changed as a function of the design of the air spring and of an applied additional air volume, but which have the same incline over the entire force path air spring characteristic. In such air springs, use is generally made of additional air volumes that are kept constant, which as actual air volume of the air spring are associated with the air spring moving in and out.

Such additional air volumes which are kept constant result in a swinging back of the seat part into a central position of the force-path air spring characteristic not being possible when the air spring is set with a force-path air spring characteristic having a small incline, since friction forces within the spring device as a whole are greater than a return force within the force-path air spring characteristic.

On the other hand, when the spring device is designed such that the return force is greater—that is to say a greater incline in the air spring characteristic is set—a comparatively hard damping is achieved both in the middle travel region and in the end of travel regions of the air spring.

Moreover, when using an air spring in an air spring characteristic range with a small incline—the so-called comfort range—which requires that a large additional volume be switched on, reaching of the end stops in the end of travel regions of the air spring in the event of large in and out movements becomes probable on account of a high degree of unevenness, as a result of which there is a reduced seating comfort for the user of the vehicle seat. The setting of a comfort range is generally desired in the case of air springs for vehicle seats on account of better transmission values and the higher degree of comfort resulting therefrom.

SUMMARY OF THE INVENTION

Accordingly, it is an object of the present invention to provide a spring device for a vehicle seat, which spring device can operate and also be installed and removed independently of a hydraulic or pneumatic on-board power supply and provides a high degree of travelling comfort for a user when using the vehicle seat in a comfort range which is reproduced by a force-path air spring characteristic having a very small incline. Furthermore, it is an object of the invention to provide a method of springing a vehicle seat using such a spring device.

An essential point of the invention is that in a spring device for a vehicle seat having at least one air spring arranged between a seat part and a lower part for the height adjustment of the seat part and having a control device for controlling the supply and discharge of at least one additional air volume to or from the air spring, the additional air volume that can be supplied or discharged can be changed or switched off by means of the control device at a selectable run in and/or run out position of the air spring such that an incline in the profile of a force-path air spring characteristic of the air spring in a first and in at least one further range are different from one another. By way of example, an increase in the incline of the force-path air spring characteristic for the further ranges has the effect, in end of travel regions of the air spring, that when using an air spring characteristic with a small incline in the first range, firstly, upon reaching the predefinable in or out position of the air spring, a return force is obtained that is sufficient to bring about a return of the seat part into the central position of the flat air spring characteristic within the first range. Secondly, the end stops of the air spring may not be reached since there is a sufficient spring force on account of the steeper air spring characteristic in the further range.

The additional air volume that can be supplied or discharged in the at least one further range which follows the first range is smaller than in the first range or completely zero and may be supplied or discharged in a number of stages, preferably in three stages. In this way, different degrees of damping can be set as a function of the desired seating comfort.

Such vehicle seats are preferably used for utility vehicles such as tractors, construction site vehicles and stacking trucks and in the first range with a flat characteristic have an additional air volume of more than 0.1 l at a natural seat frequency of for example around 1.0 Hz and a transmission value from a range of 0.1-0.9. The additional volume in the first range is greater than 0.1 l. The additional volume in the further range is either 0.0 l or greater than 0.0 l. Preferably, the additional volume in at least one further range is smaller than in the first range. As a result, when the in position of the air spring is exceeded, there is an increase in the spring force which allows the air spring to come out quickly and returns the user of the vehicle seat once more to the central position within the first range of the characteristic.

Likewise, when a defined out position is exceeded, there is a loss of spring force within the air spring which brings the air spring quickly back in and accordingly makes the user fall back into the predefined central position of the characteristic within the first range.

According to one preferred embodiment, the spring device has an adjustment device for the automatic height adjustment of the seat part at the start of a use operation by a user having a predefined weight, with air being supplied to or discharged from the air spring such that the air spring can adjust to a central position in the first range of the force-path air spring characteristic. The adjustment device comprises, in the region of the armrest of the vehicle seat, a regulator switch for operating the adjustment device. Automatic positioning of the user in the comfort range of the spring device, namely at the central position in the first range of the characteristic, as a function of his weight is thus possible, without thereby reducing the further range in which the characteristic has a greater or smaller incline.

According to one preferred embodiment, the spring device has a recognition device for recognizing a user using the vehicle seat, in particular by means of his weight, in order to allow the automatic activation of the height adjustment when the user sits down in the vehicle seat.

The first range of the force-path air spring characteristic preferably corresponds to a length of travel of the air spring of up to 3000 mm, whereas the at least one further range corresponds to a length of travel of preferably up to 2000 mm.

The at least one further range adjoins the first range on the left-hand or right-hand side as of the defined run in and/or run out positions of the air spring.

The exceeding of the run in and run out positions is recognized by means of recognition and switching devices and the spring device is switched to supply and discharge the changeable additional air volume by means of the control device. An automatic transition of the spring characteristic from a comfort range (first range) into a progression range (further range) and/or a degression range (further range) is thus ensured.

In a method of springing a vehicle seat, according to the invention, when the air spring exceeds the selectable run in and/or run out positions, the additional air volume that can be supplied or discharged is changed or switched off by means of the control device in order to change the incline in the profile of the force-path air spring characteristic in the first and in at least one further range. In the event of the run in and run out positions being exceeded, the changeable additional air volume is supplied or discharged only when recognition and switching devices in first and second end of travel regions are activated on account of vibration, regularly and at a high frequency by the air spring moving in and out. The consequence of this is that in the event of the air spring moving in and out in an irregular manner or in the event of the in and out movement taking place with long time intervals (smaller than or equal to 1.0 Hz), uneconomical activation of the recognition and switching devices is avoided, thereby achieving an energy saving.

BRIEF DESCRIPTION OF THE DRAWINGS

Advantages and expedient features of the invention can be found in the following description in conjunction with the drawing, in which.

DETAILED DESCRIPTION OF THE PREFERRED EMBODIMENT

Figure 1:
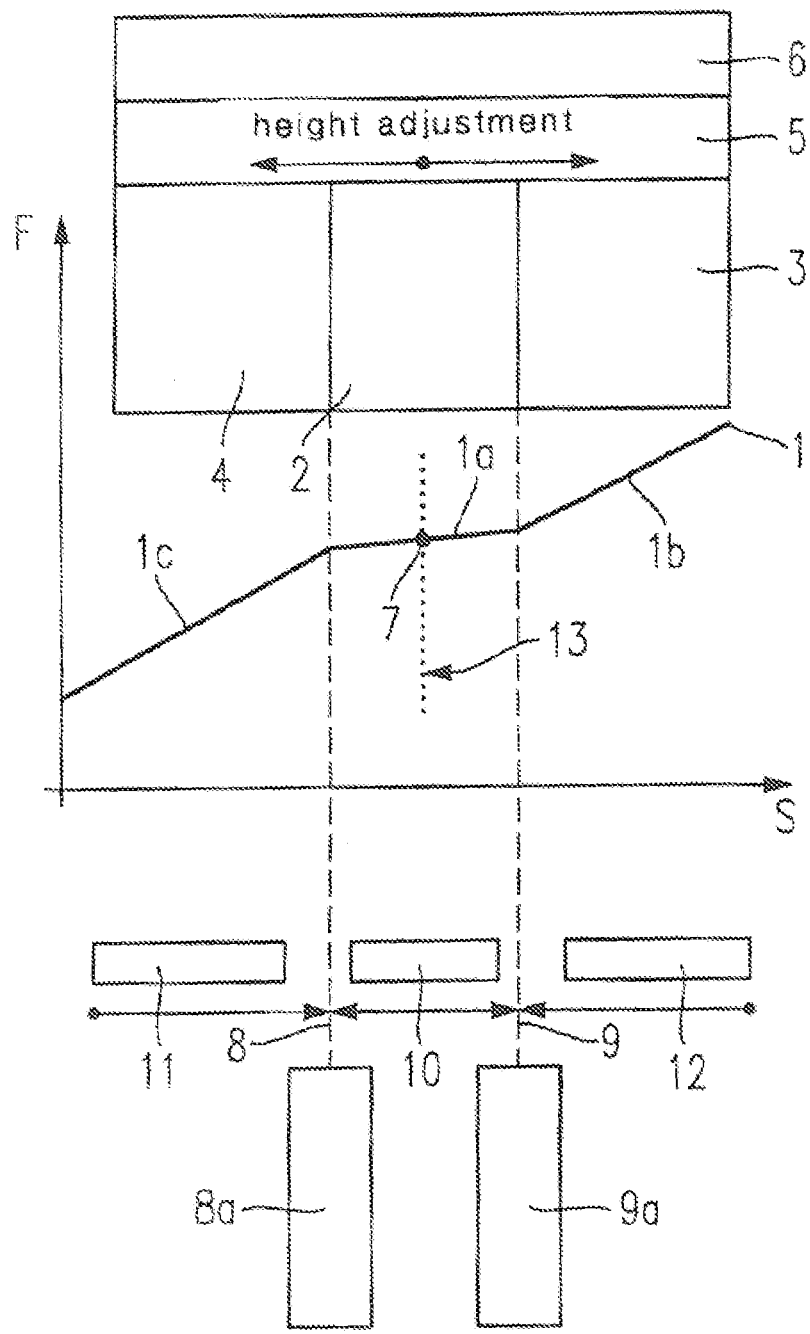
FIG. 1 shows a schematic diagram of a force-path air spring characteristic of a spring device according to one embodiment of the invention.

Advantages and expedient features of the invention can be found in the following description in conjunction with the drawing, in which:

FIG. 1 shows a schematic diagram of the profile of a force-path air spring characteristic 1 according to one embodiment of the invention, where the air spring characteristic 1 is made up of the sections I a, I b, I c. In the diagram, the force F is plotted on the ordinate and the return path s of the air spring is plotted on the abscissa.

Ideally, the individual sections 1a, 1b and 1c run so that they merge fluidly into one another such that the transitions may be arc-shaped, with it being possible for the arcs to have different dimensions.

In a first comfort range 2, in which an additional air volume of more than 0.1 liter is supplied to or discharged from the air spring, the air spring characteristic has the section 1a with a small incline. In a second progression range 3, in which an additional air volume that is smaller than the additional air volume discharged in the first comfort range 2 is supplied, the air spring characteristic 1 has the section 1b with a greater incline than that in section 1a. Likewise, in a third degression range 4, in which an additional air volume that is also smaller than the additional volume discharged in the first comfort range 2 is discharged, the air spring characteristic has the characteristic section 1c with a greater incline than in section 1a.

A height adjustment 5 in the event of the air spring moving in and out as a result of vibration, as occurs for example when travelling over potholes in the road, is carried out within the first, second and third ranges 2, 3, 4. The ranges 2, 3 and 4 are combined in a switching window 6.

Within the first comfort range 2, a seat part of the vehicle seat is ideally arranged in a central position 7 of the characteristic, with it being possible for the central position 7 to be displaced vertically on an HA line 13 as ideal line.

As soon as a departure is made from the first comfort range 2 on the left-hand or right hand side on account of the spring element moving in or out and a predefined run in or run out position 8, 9 is exceeded, a recognition and switching device 8a, 9a recognizes this and switches the entire spring device to supply or discharge the other additional air volume, specifically having a smaller volume. The comfort range 2 corresponds to a length of travel 10 the upper limit of which may lie within a range of 0.1-3000 mm depending on the technical requirements, whereas the digression range 4 and the progression range 3 may have lengths of travel 11, 12 with upper 1 limits of 0.1-2000 mm.

The sequence of operation of the spring device according to the invention is as follows:

1. A driver takes up his position in the vehicle seat and a recognition by virtue of his weight is carried out by means of a driver recognition device. The weight loading of the spring device leads to an exceeding of the predefined run out position 9.

By means of an air supply (not shown here), air is automatically let into the spring device, whereupon the driver is guided with the seat part into the central position 7 within the comfort range.

Figure 2:
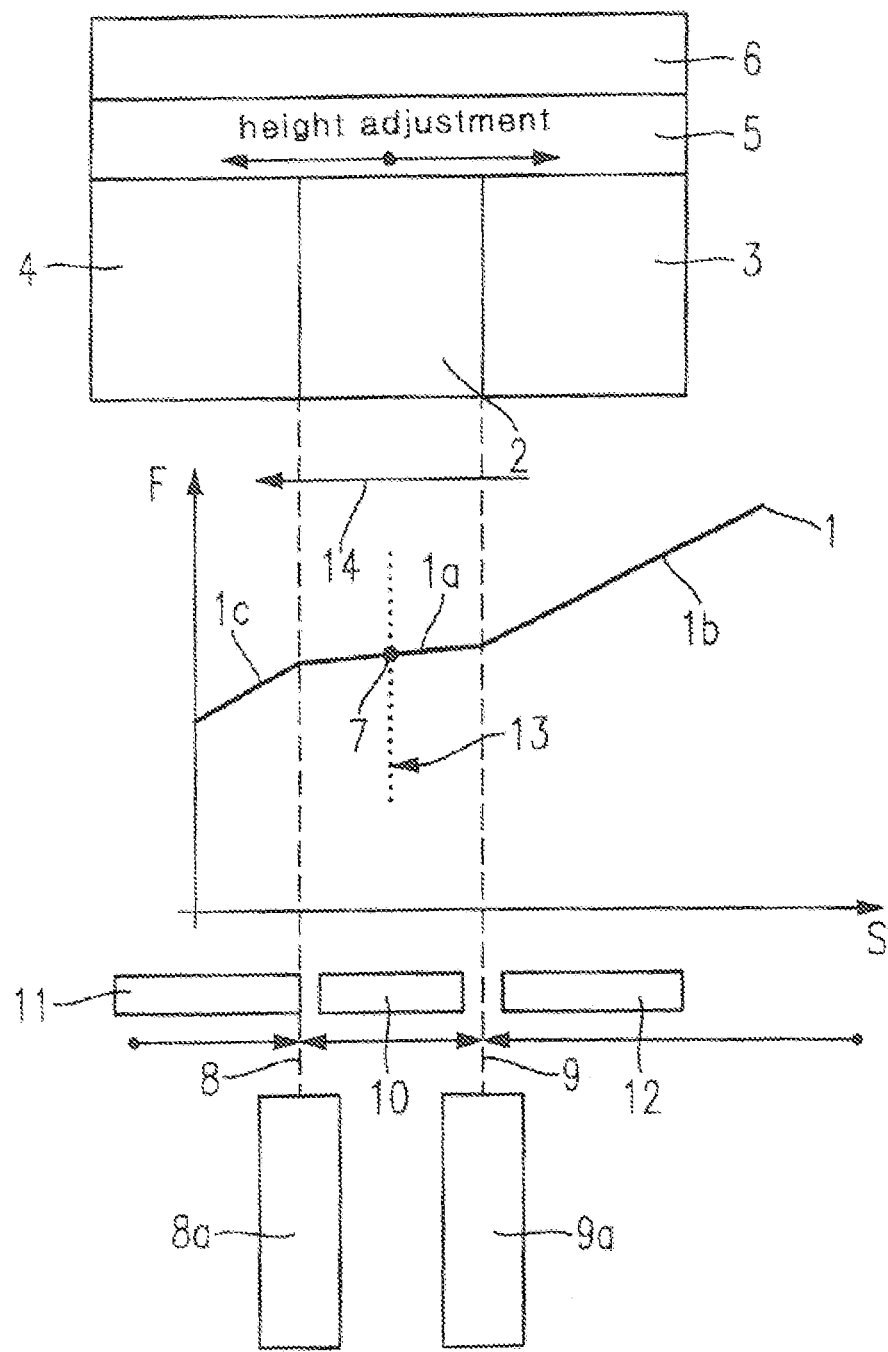
FIG. 2 shows a schematic diagram of the air spring characteristic shown in FIG. 1, in a displaced position.
Figure 3:
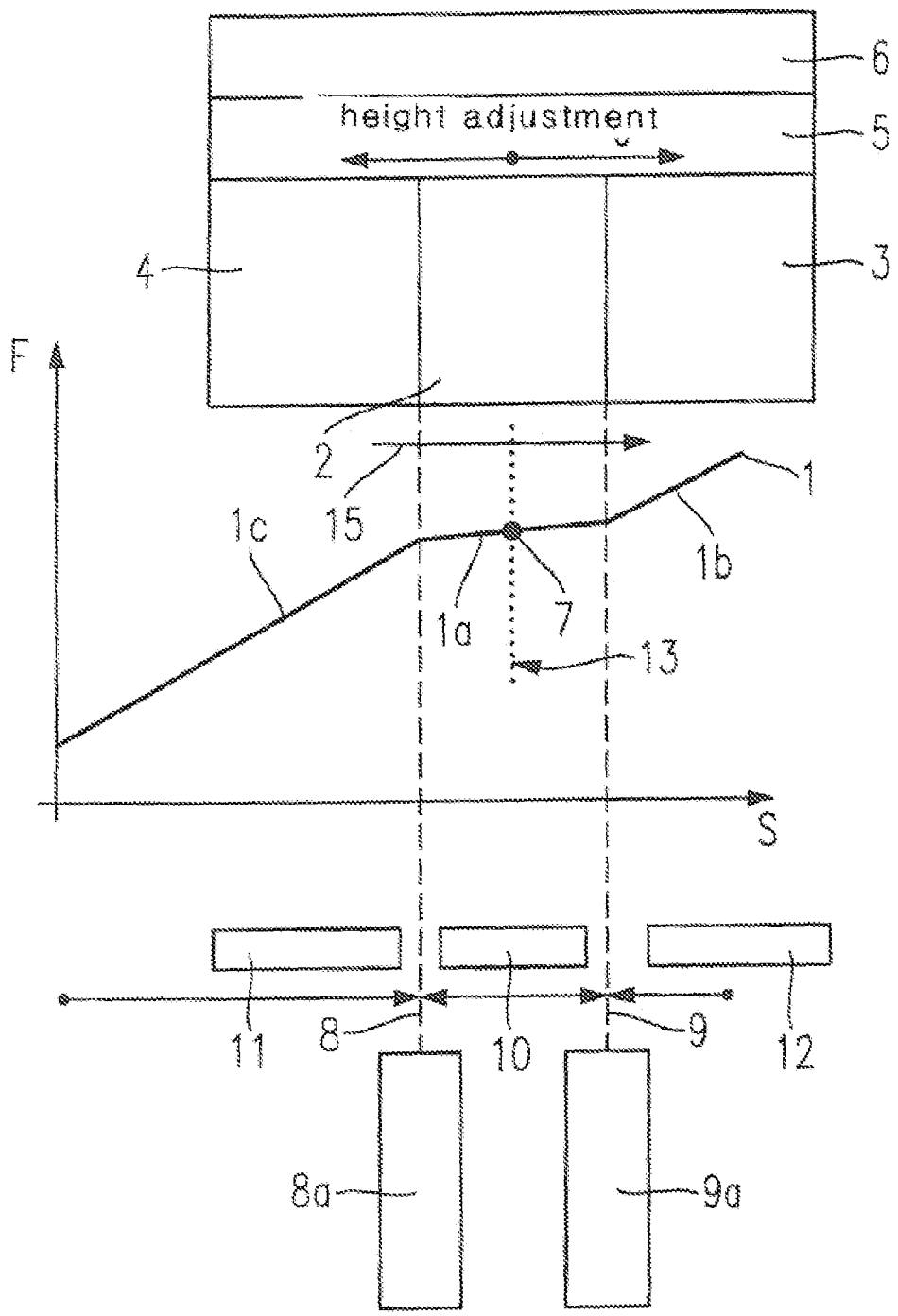
FIG. 3 shows a schematic diagram of the air spring characteristic shown in FIG. 1, in a further displaced position.

The central position 7 may be displaced within the force-path diagram in order to set a desired individual height of the seat part by using an operating device, which is preferably fitted in the armrest region of the vehicle scat, to displace the switching window 6 within the diagram, as shown for example in FIGS. 2 and 3. FIGS. 2 and 3 show the position of the switching window with the associated first, second and third ranges 2, 3, 4 in the case of a seat part that has been height-adjusted in the upward and downward direction, respectively.

2. As soon as a regularly high frequency vibration (~1.0 Hz, pulse number of 10) occurs and this is recognized by the recognition and switching device, upon activation of the recognition and switching device 9a a signal is output to the air supply, by means of a control device (not shown here), to raise the HA position 7. In the event of an irregular vibration with long time intervals (:<S; 1.0 Hz), no signal is output.

3. Upon repeated, regularly high frequency contacting of the recognition and switching device 8a (~1 Hz, pulse number of 10), a signal is output to the air supply, by means of the control device, to lower the HA position 7 by discharging air. In the event of an irregular vibration with long time intervals (:S 1.0 Hz), no such signal is output.

4. The control device calculates, at defined time intervals, such as for example in the order of magnitude of 1.0 s, the mean value of the vibration amplitudes and brings the profile thereof into congruence with the selected HA line 13 by supplying or discharging compressed air.

5. The HA line 13 lies in the centre of the comfort window, the width of which can be regulated in a stepped or stepless manner by way of rotary switches or step switches. The width of the comfort window corresponds to a length of travel the upper limit of which lies in a range of 0.1-3000 mm.

The progression range 3 starts from the position 9 and becomes a steep characteristic with an additional air volume of for example 0.0 l or a value greater than 0.0 l. The spring device thereby becomes rigid in the lower range, i.e. including outside the comfort range, as a result of which a deflection or an end stop of the air spring is reduced. The minimum value of the length of travel is required for this. A return of the air spring in the direction of the HA position 7 then takes place.

6. If, in the event of permanently strong vibration excitation, a characteristic in the progression range having an incline which corresponds to an additional air volume of greater than 0.0 l is not sufficient, an even steeper characteristic, which corresponds to an additional air volume of 0.0 l, is used. Should this characteristic also not suffice for sufficient damping, the complete switching window is automatically displaced upwards in steps, as shown by the arrow 14 in FIG. 2.

7. Similarly, in the degression range, in the event of an insufficiently great incline in the characteristic, which corresponds to an additional air volume of more than 0.0 l, an additional air volume of 0.0 l is used. Should such a characteristic also not allow the necessary loss of force in the degression range for the rapid lowering of the driver and of the vehicle seat, then the complete switching window 6 is automatically displaced downwards in steps, as shown by the arrow 15 in FIG. 3.

Figure 4:
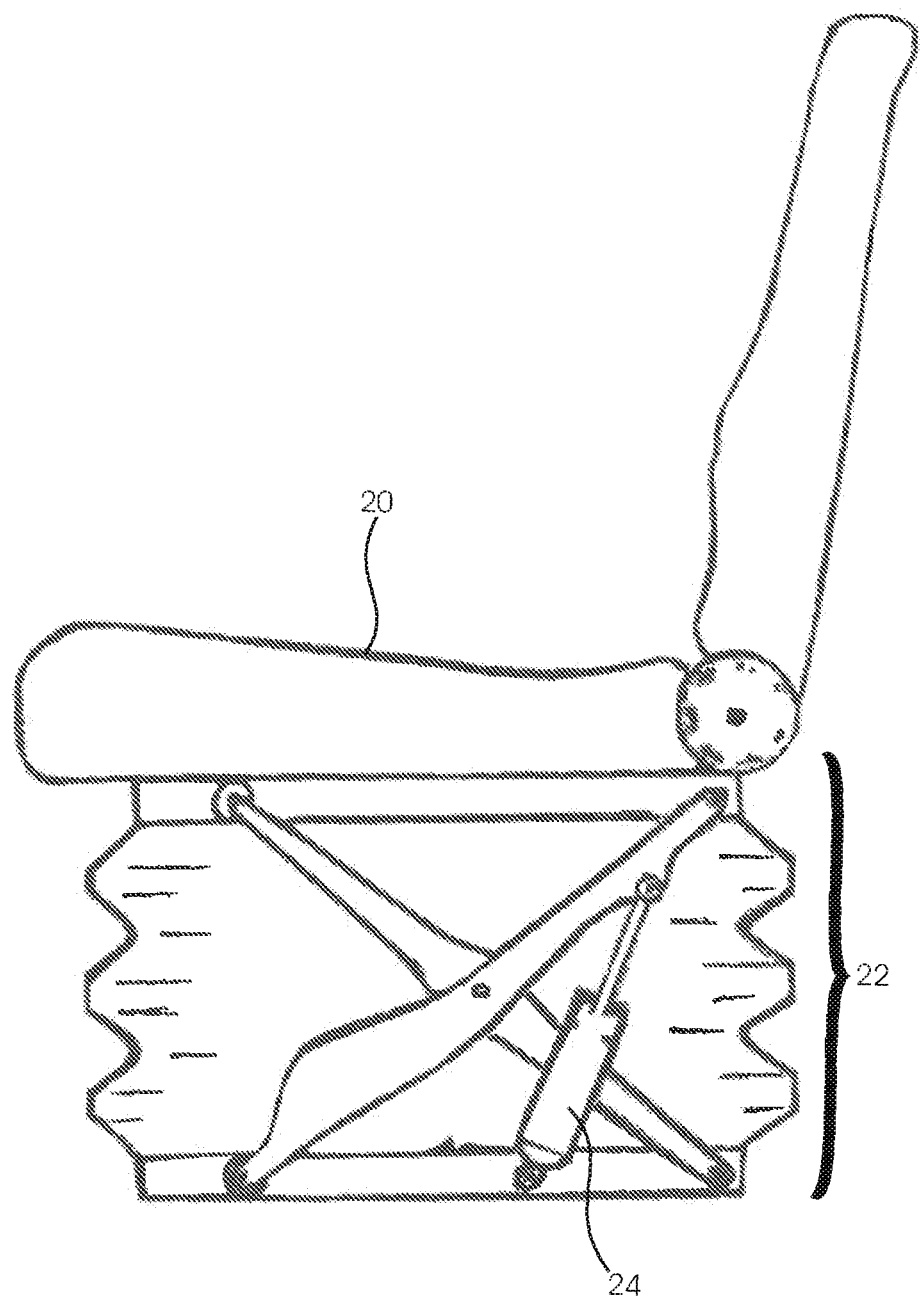
FIG. 4 shows a vehicle seat according to the invention.

FIG. 4 illustrates a vehicle seat 20 mounted on a lower part 22, such that the seat 20 is vertically adjustable. An air spring 24 with the characteristics discussed above is appropriately located to cause the seat 20 to be moved to or returned to the desired height.

The control device advantageously comprises software which is matched to the respective vehicle type and to the character thereof, with it being possible for the software to be optimized in an improvement process that is carried out continuously. By reading via a PC or via a laptop, the vehicle occupant receives a current update version of the software.

Preferably, by changing the basic software it is possible to change the use purpose of the vehicle seat such that, for example, a use of the vehicle seat both in a large tractor with a sprung cabin and in a small tractor is possible.

All the features of the invention are considered essential to the invention both individually and in combination. Modifications thereof are familiar to the person skilled in the art.

The embodiments of the invention in which an exclusive property or privilege is claimed are defined as follows:

1. An apparatus comprising:
   a vehicle seat having a seat part and a lower part for a height adjustment of the seat part wherein the vehicle seat has a desired comfort range of travel and two out-of-comfort ranges of travel, wherein a border is defined at the point of transition between the comfort range and each out of comfort range, where the borders between said comfort range of travel and out-of-comfort ranges each define a run in/run out position;
   at least one air spring arranged for the height adjustment of the seat part; and
   a control device for controlling the supply of at least one additional air volume at least to or from the air spring,
   wherein an additional air volume is supplied to the air spring when the vehicle seat is in the comfort range of travel, and at a selectable run in/run out position of the air spring, the additional air volume is switched off when the vehicle seat goes from the comfort range of travel to the out-of-comfort range of travel, under control of the control device, such that the volume in which the air to be compressed is less in the out-of-comfort range than in the comfort range of travel and the inclines in a force-path air spring characteristic of the air spring in a first and in at least one further range are different from one another,
   wherein the additional air volume of more than 0.1 liter is at least one of supplied to or discharged from the air spring, in the first comfort range the air spring characteristic has a first section with a small incline, wherein in a second out-of-comfort range, in which an additional air volume that is smaller than the additional air volume discharged in the first comfort range is supplied, the air spring characteristic has a second section with a greater incline than that in the first section and in a third range, in which an additional air volume that is also smaller than the additional volume discharged in the first comfort range is discharged, the air spring characteristic has a characteristic section with a greater incline than in the first section;
   wherein within the first comfort range a seat part of the vehicle is arranged in a central position of the force-path air spring characteristic with the central position being displaceable vertically;
   wherein the control device is configured, in response to detecting, by a first switching device, a regular high frequency vibration of more than 10 pulses at or above 1.0 Hz, to output a first signal to an air supply device to input air to the air spring effective to raise the central position of the force-path air spring characteristic; and
   wherein the control device is configured, in response to detecting, by the first switching device, an irregular vibration of less than 1 Hz or less than 10 consecutive pulses of 1 Hz or more, to refrain from outputting the first signal.

2. The apparatus according to claim 1, further comprising at least one pneumatic directional control valve configured to at least one of supply or discharge the additional air volume(s) to the air spring.

3. The apparatus according to claim 1, wherein the control device performs automatic height adjustment of the seat part at the start of operational use by a user having a predefined weight, wherein air is at least one of supplied to or discharged from the air spring under control of the control device such that the air spring adjusts to a central position in the first range of the force-path air spring characteristic.

4. The apparatus according to claim 3, further comprising a regulator switch that is arranged in the region of an armrest of the vehicle seat.

5. The apparatus according to claim 1, further comprising an operating device configured to operate the control device by a user action such that the seat part is adjusted to a desired height.

6. The apparatus according to claim 1, further comprising a recognition device configured to recognize a user using the vehicle seat by his weight.

7. The apparatus according to claim 1, wherein the additional air volume greater than 0.1 liter is at least one of supplied or discharged in the first range of the force-path air spring characteristic and additional air volume is at least 0 liter in the other ranges.

8. The apparatus according to claim 1, further comprising recognition and switching devices configured to recognize the selectable run in and run out positions of the air spring and to switch the spring device to supply and discharge the changeable additional air volume based on control by the control device.

9. The apparatus according to claim 1, wherein upon detecting, by a second switching device, a regular high frequency vibration of more than 10 pulses at or above 1.0 Hz, the control device is configured to output a second signal to the air supply device to release air from the air spring effective to lower the central position of the force-path air spring characteristic; and wherein upon detecting, by the second switching device, an irregular vibration of less than 1 Hz or less than 10 consecutive pulses of 1 Hz or more, the control device is configured to refrain from outputting the second signal to the air supply device.

10. The apparatus according to claim 9, wherein the first switching devices is configured to detect run in of the at least one air spring and the second switching device is configured to detect run out of the at least one air spring.

\* \* \* \* \*